March 30, 1965     D. A. BROWN ETAL     3,175,655
CONTROLLED EXPANSION STRUCTURAL BEAM AND
GRID STRUCTURE INCLUDING SAME
Original Filed Feb. 16, 1962     3 Sheets-Sheet 1

INVENTOR.
DONALD A. BROWN
BY LUCIEN R. DOWNING, JR.

ATTORNEYS.

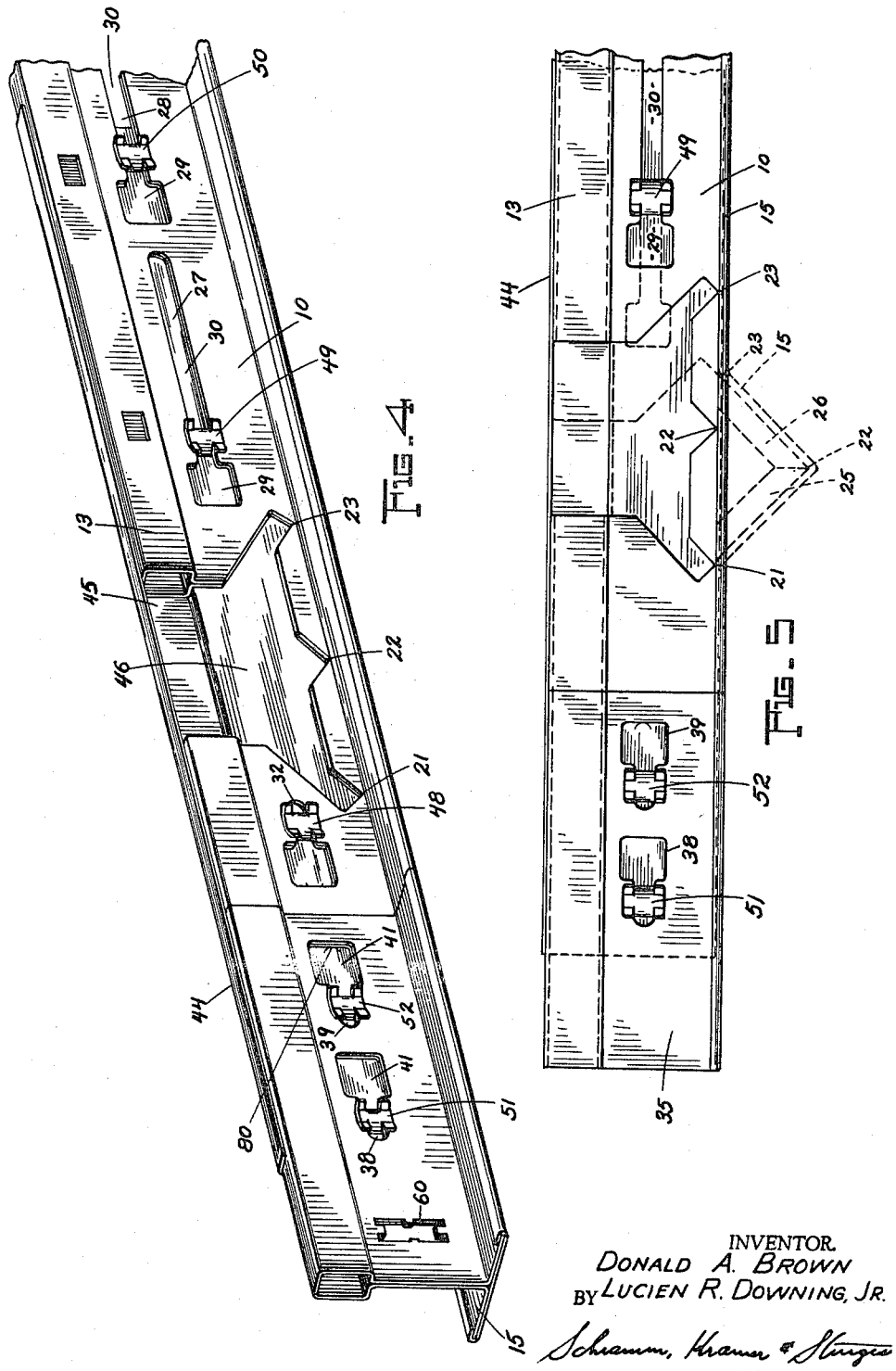

March 30, 1965  D. A. BROWN ETAL  3,175,655
CONTROLLED EXPANSION STRUCTURAL BEAM AND
GRID STRUCTURE INCLUDING SAME
Original Filed Feb. 16, 1962  3 Sheets-Sheet 3
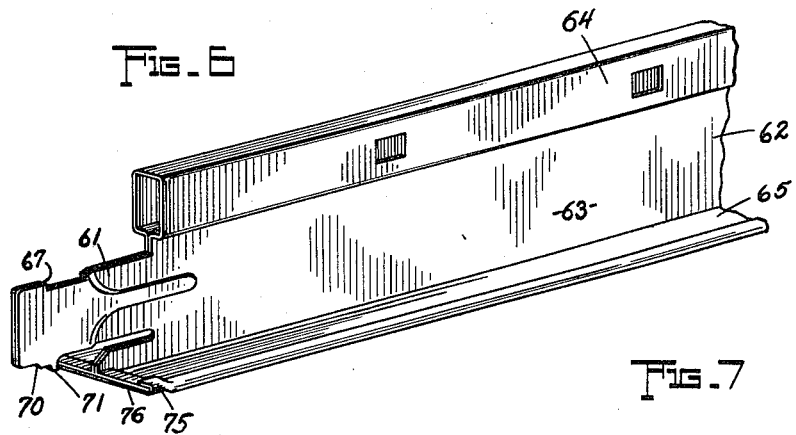
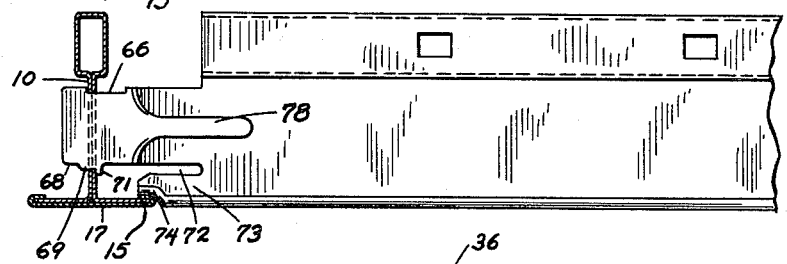
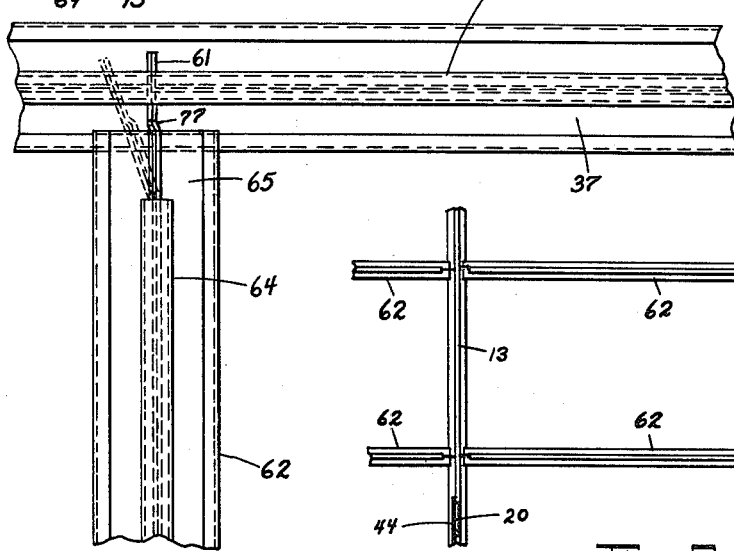
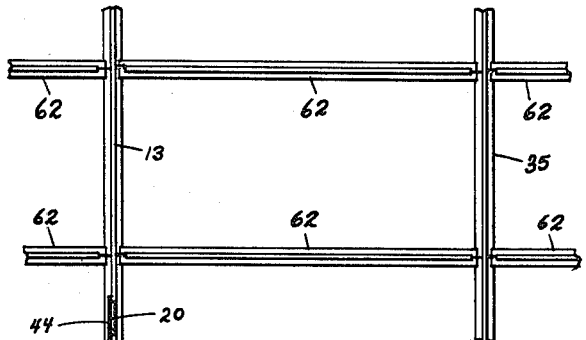
INVENTOR.
DONALD A. BROWN
BY LUCIEN R. DOWNING, JR.
ATTORNEYS.

United States Patent Office 3,175,655
Patented Mar. 30, 1965

3,175,655
CONTROLLED EXPANSION STRUCTURAL BEAM
AND GRID STRUCTURE INCLUDING SAME
Donald A. Brown, Westlake, and Lucien R. Downing, Jr.,
Avon Lake, Ohio, assignors to Donn Products Incorporated, Westlake, Ohio, a corporation of Ohio
Original application Feb. 16, 1962, Ser. No. 173,653, now Patent No. 3,142,367, dated July 28, 1964. Divided and this application June 1, 1964, Ser. No. 371,375
5 Claims. (Cl. 189—82)

This application is a division of our application Serial No. 173,653, filed February 16, 1962, now Patent No. 3,142,367.

This invention relates, as indicated, to a structural member, and more particularly to a structural beam member which is characterized by means for isolating to a particular portion of the beam the deformation of the beam due to thermal expansion. This invention relates more specifically to a system including such structural beams in combination with cross beams for supporting a wall, floor or ceiling.

Metallic structural members when exposed to very high temperatures, and particularly those which obtain during a fire, undergo a considerable increase in length. Unless means are provided for absorbing the increase in length due to thermal expansion, long structural members bend and become disengaged from components supported thereby. These components lacking required support may fall away or part sufficiently to expose normally hidden structure to the effects of fire, thus greatly extending the damage. If such supported components could be maintained in position for even a few minutes longer, damage to the overall structure could in many cases be greatly minimized.

This is particularly true in the field of suspended ceilings. If such ceilings can be maintained in position in spaced relation to a ceiling for as much as a few minutes longer than heretofore possible, the combination thereof with the air space between the suspended ceiling and the main ceiling provides insulation to protect the super structure. When a suspended ceiling assembly of conventional construction is exposed to fire, the suspending beam deforms sufficiently to permit individual tiles to fall out, thereby permitting the temperature adjacent the main ceiling to increase to the kindling point and, if unchecked, to the ultimate destruction of the super structure.

The devices of the present invention provide means for isolating the expansion of longitudinal supporting structural beams formed from thermally responsive materials, such as steel, to a given point in the beam span. Thus, the deformation which does occur does not result in substantial displacement of the beam in a lateral direction, and the ceiling members or units continue to be supported during the expansion of the main beam. Also in accordance with this invention, cross beams are provided with means which coact with the main beams during expansion to aid in maintaining the spacing between such crossing means for the continued support of marginal edges of such ceiling members.

Accordingly, then, there is provided in accordance with the present invention a system for the structural support of a suspended ceiling or ceiling member. This system is characterized in that under exposure to extremely elevated temperatures, expansion of the structural beams is controlled and isolated to a particular point in the beam. Under such elevated temperatures, the relative spatial arrangement of the supporting structural members is substantially maintained for the support of ceiling members even though the main beams undergo thermal expansion. Thereby, we are able to maintain for an additional period of time the insulating effects of a confined air space between the suspended ceiling and the main ceiling. In the system including the improved structural beams hereof, these beams are disposed in transverse relation, preferably perpendicular relation, to cross beams which coact therewith to provide a panel supporting structure in which the geometric configuration of the system at normal temperatures is substantially the same as the geometric configuration of the system at elevated temperatures whereby the panel members continue to be supported thereby at such elevated temperatures.

The present invention may be better understood by having reference to the annexed drawings wherein a preferred embodiment of the present invention is illustrated, and wherein:

FIG. 4 is a perspective view of an assembled section of a beam in accordance with the present invention.

FIG. 5 is a plan view of a main structural beam such as shown in FIG. 1 showing the normal and expanded position.

FIG. 6 is a perspective view of a portion of a cross beam of the present invention.

FIG. 7 is a fragmentary cross-sectional view showing the interlocking of a cross beam with a main structural beam.

FIG. 8 is a fragmentary top view of an interlocked cross beam with a main structural beam showing normal and expanded position.

FIG. 9 shows a portion of a suspended ceiling grid embodying the principles of the present invention.

Figure 1:
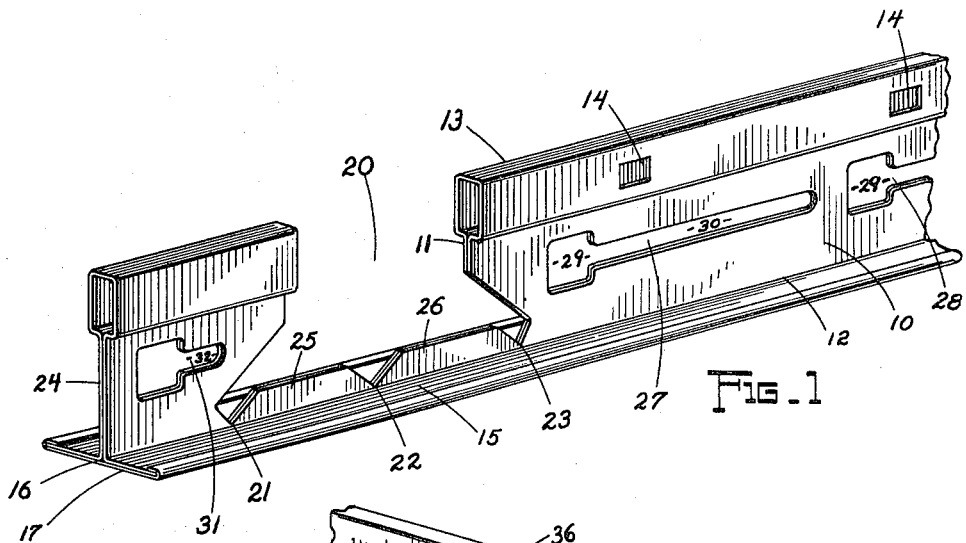
FIG. 1 is a perspective view of a portion of a main structural beam of the present invention.

Briefly stated, the present invention is in the provision of a controlled expansion structural beam which is characterized by a web portion having spaced parallel marginal edges. Disposed along at least one of the marginal edges is a flange which may be conveniently adapted to support the marginal edges of room enclosing members or panels, such as acoustic tile, gypsum board, and the like. Intermediate the extremities of the beam, and preferably at one end thereof, the web is provided with a cut-out portion so as to provide a longitudinal discontinuity in the beam, which discontinuity is spanned by the continuous flange. Means are provided coacting between the web and the flange which enable the flange to bend independently of the remainder of the beam as the beam moves longitudinally. To support the beam against deflection under load in the region of such cut-out portion, reinforcing means may be provided which are adapted to coact with said beam and span the cut-out portion of the web.

In a suspended ceiling grid assembly or system, for example, a plurality of main structural beams are generally disposed in spaced parallel relation. The spacing generally corresponds to one dimension of a panel or tile member, for example acoustic tile, to be supported thereby. The space between adjacent main structural beams is likewise sub-divided by means of cross beams conveniently disposed on centers which accommodate the remaining dimension of the tile member to be suspended thereby. The cross beams are adapted to be supported at their extremities by main beams and are usually disposed in perpendicular relation to the main beam. In accordance with the present invention the cross beams are interlocked therein in suitable slots disposed in the web of the main beam adapted to receive coacting tongue members which are essentially continuations of the web portion of the cross beam, as will be hereinafter more particularly described.

When the temperature of such a grid assembly is raised substantially, the expansion of the main beams is taken up in the portion of the continuous flange adjacent the cut-out portion of the beam. The spacing between the cross ties or cross beams is maintained by the panel members suspended thereby. However, the elongation of the main beam containing the slots receiving the tongues of the cross ties causes a lateral displacement of such slots. The tongue members of the cross beam being of thin cross-sectional dimension and a continuation of the web thereof, are able to deflect without distorting the spatial relationship of the cross beams, and thereby maintain support for the tile members while simultaneously accounting for the lateral displacement of the cross-beam retaining slot in the web of the main beam.

The cross beams are generally of much shorter length than the main beams, for example 24″ as opposed to 144″. While the novel controlled expansion structure of the present invention may also be included in the cross beams, where the length is up to 48″, this has not been found necessary. Such expansion as the cross beams do undergo is accounted for by lateral displacement of a tongue portion as hereinafter described.

Referring now more particularly to the drawings, there is shown in FIG. 1 in perspective view one extremity of a main structural beam in accordance with the present invention. The beams of the present invention are preferably formed of steel plate, for example electro-zinc coated cold rolled steel 0.020″ thick formed about a mandril and provided with a web portion 10 having spaced parallel marginal edges 11 and 12. The upper edge of the web 10 shown in FIG. 1 is conveniently provided with a bead 13 which may contain a plurality of spaced perforations 14 to aid in suspending the beam from a main ceiling. Disposed along the lower marginal edge 12 of the web 10 is a continuous flange 15, which in the preferred embodiment shown in FIG. 1 is preferably perpendicular to and bisected by web 10, i.e., T-shaped. In order to cover the fold line 16 and to provide a decorative exposed surface, a cap 17 is tight wrapped about the marginal edges of the flange 15. The cap 17 is conveniently formed from enameled cold rolled steel 0.010″ thick.

Near one extremity of the main beam in FIG. 1, there is provided in the web 10, a cut-out portion 20; that is, the web 10 and its upper marginal edge 11 are substantially removed so as to provide a longitudinal discontinuity in the beam which is spanned by the flange 15. In order to permit the flange to bend, and to isolate the bending to the portion of the flange 15 immediately adjacent the cut-out portion 20, notches 21, 22 and 23 are provided, the apices of which are substantially in the plane of the upper surface of the flange 15. In other words, the web is completely removed at these points so that bending of the flange 15 can occur thereat in response to longitudinal movement of the main portion of the beam of FIG. 1 as a result of thermal expansion.

The longitudinal length of the cut-out portion 20 may be conveniently determined to at least slightly exceed the anticipated elongation of the main beam as calculated from its length and coefficient of expansion. The main beams are usually 12 feet long, and contain at least one such expansion point. When the web is notched as shown in FIG. 1 at points 21, 22 and 23, at full expansion of the main beam, the flange assumes a V-shaped contour such as shown in FIG. 5. The remaining portions of the web 10 form ribs 25 and 26 which aid in providing rigidity to the flange 15 adjacent the cut-out portion 20, and aid in directing the bending during expansion as shown in FIG. 5. While the shape of the cut-out portion 20 as shown in FIG. 1 is preferred, it will be readily seen that a rectangular cut-out portion removing entirely the web portion and providing two, instead of three notched points of bending might be used. The web must be removed to the flange at least two points, and preferably three points as shown in FIGS. 1, 4 and 5.

In the main portion 24 of the beam, i.e. that portion which will undergo elongation in response to an increase in temperature, there are conveniently provided a pair of key-slots 27 and 28, preferably centrally disposed of the rib of the web 10, and in longitudinal alignment. Key-slots 27 and 28 are conveniently provided with a key-way portion 29 and elongated slot 30 extending from the key-way portion 29 in a direction opposite to the contemplated direction of elongation of the beam. The length of the slot 30 must be at least sufficient to permit lateral movement equivalent to the expansion to be allowed for in the beam.

Key slot 31 is of similar construction to key slots 27 and 28 with the exception that the slot portion 32 is short and allows for no movement in the direction of elongation due to thermal expansion. Key slot 31 is preferably, albeit not essentially, located in the web portion 10 which is adjacent an extremity 24 in the main beam.

Figure 2:
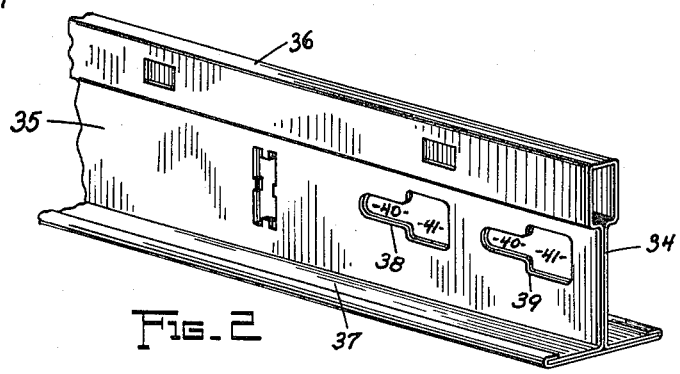
FIG. 2 is a perspective view of another portion of a main structural member of the present invention.
Figure 3:
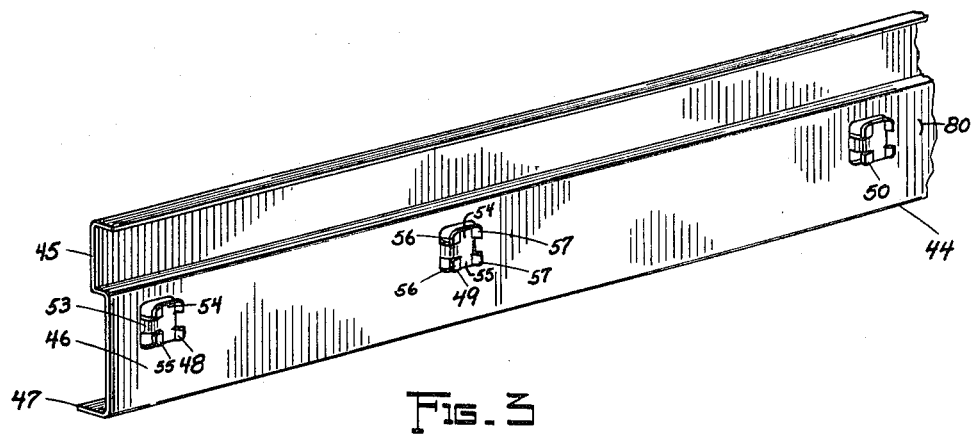
FIG. 3 is a perspective view of a reinforcing and splicing member of the present invention.

An opposite extremity 34 of a main beam is shown in FIG. 2. Frequently it is desirable to extend the length of the main beams by splicing a pair of such beams together. FIG. 3 shows such a splice in greater detail. Referring more particularly to FIG. 2, there is here shown an extremity 34 of the main beam and including a web portion 35, a bead 36 and a flange 37 so proportioned as to correspond in cross section with the beam shown in FIG. 1. Web 35 is provided with a pair of centrally disposed key slots 38 and 39 conveniently punched therethrough and disposed along a central axis of the beam. The slot portions 40 extend from the key-way portions 41 in a direction opposite to anticipated thermal expansion, and serve as stops in co-operation with key members hereinafter described.

FIG. 3 shows a reinforcing and splicing member which is adapted to coact with the beams shown in FIGS. 1 and 2 in a manner which is shown more clearly in the assembly structure of FIG. 4. Reinforcing and splicing member 44 is of substantially S-shaped cross section and formed to provide a bead engaging portion 45, a web facing portion 46 and a flange facing portion 47. Thus, the contour of the reinforcing and splicing member 44 is such as to reasonably accurately match the contour of the respective beam members to be spliced, and thus provide rigidity through the coaction of the beads 13 and 36 with the bead engaging portion 45, the coaction of the flanges 15 and 37 with the flange facing portion 47, and the coaction of the webs 10 and 35 with web facing portion 46. Flange facing portion 47 also coacts with flange 15 during expansion to force the bending of flange 15 to occur in the manner shown in FIG. 5 in dotted lines, instead of in the reverse direction. The coaction of the web facing portion 46 with the webs 10 and 35 is brought about by the provision of spaced keys, which in the preferred embodiment are in the form of butterfly clasps 48, 49, 50 and 51 and 52.

Butterfly clasp 48 which is typical of the other butterfly clasps, is formed by a punching operation in the web facing portion 46. By this operation there is provided a central band 53 and a pair of wing members 54 and 55. Wing members 54 and 55 are displaced out of the plane of the web facing portion 46, a distance which is equivalent to the thickness of webs 10 and 35. The extremities 56 and 57 of the wings 54 and 55, for example (shown in clasp 49), are conveniently bent so as to bear a diverging relationship with respect to the plane of the web facing portion 46 so as to form guide-ways to facilitate cooperative interlocking action with the key slots 27, 28, 31, 38 and 39. Facing marginal edges of the wings 54 and 55 are integral with the central band 53. The longitudinal extremities of central band 53 are integral with the web facing portion 46.

While the butterfly clasps exemplified by clasps 48 and 49 are in a preferred clasping means in accordance with the present invention for economic reasons of fabrication and installation, any other clasping means may be employed for assembling the reinforcing and splicing member in interlocking relationship with the beams.

The parts shown in FIGS. 1, 2 and 3 are shown in assembled form in FIG. 4. Accordingly, to effect assembly of such parts, the key-ways 29 and 41 of the expansion beam of FIG. 1 are placed over the butterfly clasps which they are adapted to receive, the latter being so positioned and disposed on the web facing member 46 of the reinforcing and splicing member 44 as to be readily received by said key-ways. With slight pressure, the reinforcing and splicing member 44 can be brought into releasable interlocking relationship with the beam of FIG. 1 by simply moving the beam relative to the splicing member to dispose the clasps within the slots 30 and 32. Detents 80 may be provided to insure against accidental disengagement of the parts. The extent of movement of the clasps 48, 49 and 50 within the respective slots is limited by the shortest slot, namely, slot 32 forming a reaction abutment for the beam. The coaction between the reinforcing member 44 and the key-slots 27 and 28 however, is such that all motion of these two pieces relative to each other is prevented by reaction abutment against butterfly clasp 50 except longitudinal motion in a direction corresponding to expansion of the main beam of FIG. 1.

In like manner, the terminal portion of the beam shown in FIG. 2 is interlocked with the corresponding butterfly clasp 51 and 52 with the key-slots 38 and 39 being brought into coaction interlocking relationship, and abutting relationship. By such relationship the expansion of each of the spliced beams is confined to the controlled expansion region of the respective beam, and not transmitted to the expansion region of an adjacent beam. Thus, in a preferred embodiment, the respective key-slots of the members shown in FIGS. 1 and 2 in relation to the butterfly clasps of the reinforcing and splicing member of FIG. 3 are so proportioned and arranged that when the beams are, respectively, in interlocking relationship with the reinforcing and splicing member, their extremities are in substantial abutting relationship.

It will also be seen from FIG. 4 that the reinforcing and splicing member 44 of FIG. 3 performs both the function of splicing and of reinforcing. Since the beam shown in FIG. 1 is weakened in the region of the cut-out portion 20, the reinforcing member 44 provides means for preventing deflection of the beam in that region when a load is applied to the beam. Vertical reinforcement is obtained by coaction between the bead 13 and the bead engaging portion 45 and by coaction between the flange 15 and the flange facing portion 47. Lateral reinforcement is obtained by coaction between the web 10 and the web facing portion 46.

As shown in FIG. 4, web 10 is provided also with a slot 60, a plurality of such slots being provided at suitable spaced intervals along the web 10 to receive and retain a tongue 61 at the extremity of a crossing beam or crossing T such as shown in perspective in FIG. 6. Referring more particularly to FIG. 6, cross beam 62 has substantially the same cross section as the main beam shown in FIGS. 1 and 2. As indicated above, the extremities of the cross beam are each provided with tongues 61 of the same configuration adapted to be received by and retained in slots 60 in the main beam. Accordingly, cross beam 62 is characterized by a web portion 63 having spaced parallel marginal edges, one of which is provided with a bead 64, and the other of which is provided with a flange 65 in the same manner as the main beams of FIGS. 1 and 2.

Web 63 is extended beyond the extremity of the bead 64 and the flange 65 to form a tongue portion 61. Because tongue 61, in the preferred embodiment, is elongated and free of restraining influences of bead member 64 and flange 65, and composed of only two thicknesses of relatively thin sheet metal, tongue 61 is relatively flexible with respect to web member 63 of which it is a continuation. Thus, if tongue 61 is fixedly retained in slot 60 of a main beam such as shown in FIGS. 1 and 2, expansion or elongation of the main beam will carry tongue 61 along with it as shown in FIG. 8. In so doing, elongation of the relatively short cross beam is taken up sufficiently to prevent substantial displacement thereof from the normal geometric configuration as installed. Cross beams 62, however, being held in fixed lateral spaced relation by means of tiles or panels carried between adjacent cross beams, are not free to move to compensate for the elongation of the main beam. Hence, tongue 61 bends in the region where it is free from the restraining effects of bead 64 and flange 65, and into which the tiles do not extend.

In order to securely engage tongue 61 in the slot 60, there is provided in a preferred embodiment shown in FIG. 6 on the upper surface of tongue 61 a web engaging recess 66 which in combination with the shoulder 67, enables the upper surface of the tongue 61 to be hooked behind the web 10, for example, of the main beam shown in FIG. 1. While the recess 66 is of considerably greater length than would be demanded by the thickness of the web 10, the purpose of the extra length of the recess 66 is to facilitate insertion of the hook member through the slot 60 by inserting the tongue while holding the beam 62 at an angle with respect to the web 10.

The lower marginal edge of tongue 61 is provided with a stepped shoulder 68. Land 69 is disposed directly below the outer extremity of recess 66 and spaced therefrom a distance which is equal to the depth of slot 60. Riser 70 (FIG. 6) is conveniently sloped, for example, at an angle of 45°, to aid in seating tongue 61 in recess 60. Deformable stop 71 rests against the web 10 on the side opposite to the side engaged by shoulder 67, thereby providing a rigid interlocking, weight supporting connection between the cross beam and the main beam. Stop 71 is desirably made shearable so as not to unduly restrain longitudinal expansion of cross-beam 62 and free tongue 61 for free movement transversely of slot 60 in the main beam, and thereby aiding in maintenance of the original geometric configuration of the interlocked parts.

In order to improve the flexibility of tongue 61, the unsupported length thereof is increased by means of slit 72. Web 63 is extended to form projection 73 to confer rigidity upon the flange portion 74 which intersects flange 15 of the main beam of FIG. 1. In order to lend vertical support to the cross beam 62, flange 65 is provided with an offset portion 75, the depth of such offset being sufficient to dispose the cap 17 and the balance of the cap 76 is substantially the same plane for decorative purposes.

In order that the center line of cross beam 62 may be brought into registry with the center line of one side of slot 60, i.e., slot 60a, tongue 61 is provided with a very slight offset 77. A ridge 78 may be pressed into tongue 61 to confer sufficient rigidity to facilitate handling, but insufficient to prevent bending caused by elongation of the main beam.

Referring again to FIG. 1, the slot 60 is conveniently in the form of two slots 60a and 60b in side-by-side communicating relation. Either of slots 60a or 60b may be used depending upon the exigencies of the structural situation at hand, particularly where cross beams are to be disposed on either side of a main beam.

The interlocking features of the cross beam 62 with the main beams such as shown in FIGS. 1 and 2, is more clearly shown in FIGS. 7 and 8 where the parts have numbers corresponding to those given in FIG. 6. In FIG. 8, a top view of an interlocked cross beam with a main structural member is shown in both the normal position and, in dotted lines, the relative position of the members when the main beam has been submitted to elongation due to an increase in temperature.

FIG. 9 shows a portion of a suspended ceiling grid containing the structural elements shown in FIGS. 1, 2, 3 and 6. The rectangles defined by a pair of spaced parallel main beams such as shown in FIG. 1 and a pair of spaced parallel cross beams 62 such as shown in FIG. 6 are conveniently adjusted to correspond with the marginal dimensions of standard tile or panel inserts, such as acoustic tile, e.g., 24 x 48″. Such members are conveniently disposed in the frame so defined with their marginal edges resting on the flanges of the respective members. Viewed from the underside, this provides a very decorative suspended ceiling free of the so-called "shingling effect" and characterized by the added advantage that in the event of fire, the supporting beams will not become so distorted that the dimensions of the supporting grid will exceed the dimensions of tile members supported thereby thus permitting the latter to fall. The effect of this is to maintain intact a dead air space between the suspended ceiling and the main ceiling which serves to insulate the structure of the main ceiling from excessive temperatures in the room. Temperatures of 2000° F. below the suspended ceiling and 1000° F. immediately above it have been recorded. While such a suspended ceiling is not calculated to be a fire wall, nevertheless it will maintain such an insulation barrier for the extra few minutes which may result in ability to save the superstructure from extensive damage due to fire.

The systems of the present invention are particularly characterized in that instead of providing expansion means between each pair of crossing beams, the expansion of a long main beam section is accumulated for such long section and localized at one point. For example, in a 12 foot main beam there may be 6 crossing beams on 24″ centers. Instead of expansion means at 6 points on the main beam, a single expansion means of the type herein described will suffice. Likewise, it will be seen that moving longitudinally from a fixed point on the main beam, the displacing force on the cross beam will be slight, and as the expansion point is approached, the longitudinal displacement with respect to each succeeding crossing beam increases. However, the coaction of the tongue interconnecting means with the main beam is able to absorb this displacement and the flanges of the crossing beams do not become disengaged from the members supported thereon.

Elongation of the crossing beams themselves may be provided for by shearing off the shoulder 71 as above explained thus permitting the cross beam to move transversely with respect to the plane of the web of the main beam.

There has thus been provided an improved structural beam member characterized by controlled expansion whereby the expansion due to an increase in temperture for example is taken up in a portion of the flange so that the main beam is not spatially displaced. Cross beams are also provided with beams which coact with the main beams to allow for thermal elongation so that the spatial relationship of the cross beams is maintained. Under these circumstances tiles or panels supported by the structure remain in place and preserve the insulation effect of a dead air space on the reverse side thereof.

While the foregoing invention has been described with particular reference to beams for use in fabricating a suspended ceiling, it will be understood that the principles of this invention may be applied as well to large main structural beams and cross beams used for supporting concrete slabs and the like.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. A thermally responsive grid structure adapted to support a plurality of panel members in a substantially rigid common plane comprising in combination, a plurality of parallel spaced main beams each including a web portion having a flange along at least one edge, each main beam having integrally coacting means for absorbing linear expanison at a single predetermined localized region thereof, a plurality of spaced cross beams disposed transversely between the main beams, means coacting in interlocking relation between the main beams and the extremities of the cross beams to provide a substantially predetermined spatial disposition of opposed pairs of main and cross beams relative to each other, each of said cross beams including a web portion having a flange along at least one edge, said main and said cross beams being disposed in the grid with their flanges in a substantially common plane for supporting said panel members in coacting co-planar relation between the web portions of the main and cross beams, and each of said cross beams having a predetermined flange configuration at their interlocking extremities adapted to coact at such interlocking extremities with the adjacent main beams to permit lateral displacement of said interlocking extremities during expansion of the interlocked main and cross beams while maintaining the substantially predetermined spatial disposition of opposed pairs of main and cross beams and the coacting coplanar relationship of the panel members intact.

2. A thermally expansible grid structure in accordance with claim 1 in which the means coacting with the interlocking extremity of the cross beams includes means for supporting the flange of the cross beam relative to the flange of the main beam for free movement of the main beam transversely of the cross beam.

3. A beam comprising, a web portion having a transverse panel supporting flange along one edge, said web portion being of reduced transverse dimension and projecting beyond said flange at the extremities of the beam for interlocking coaction with other intersecting beam members to secure the beam in a substantially predetermined spatial position between such other members, and a predetermined flange configuration at each interlocking extremity adapted to coact with such other members and the supported panel member to permit lateral displacement of said projecting portions in response to expansion of the beam and relative transverse movement of such other members while maintaining the substantially predetermined spatial disposition of the beam therebetween.

4. A thermally responsive grid structure adapted to support a plurality of panel members in a substantially rigid common plane comprising in combination, a plurality of parallel spaced main beams each including a web portion having spaced apertures therein and having a panel supporting flange along at least one edge, each main beam having integrally coacting means for absorbing linear expansion at a single predetermined localized region thereof, a plurality of parallel spaced cross beams disposed transversely between the main beams, means coacting in interlocking relation at the apertures in said main beams between the web portions of said main beams and the extremities of the cross beams to provide a substantially predetermined spatial disposition of the main and cross beams relative to each other, each of said cross beams including a web portion having a panel supporting flange along at least one edge, said main and cross beams being disposed in the grid with their flanges in substantially abutting relation and in a substantially common plane for supporting said panel members in coacting co-planar relation between the web portions of the main and cross beams, each of said cross beams having means coacting at their interlocking extremities between the abutting flanges of the main and cross beams for supporting the cross beams on the main beam while permitting longitudinal movement of the flange of the main beam relative to the flange of the cross beam during expansion of the interlocked main and cross beams the extremities of said cross beams each including a laterally deflectable tongue for insertion in a main beam aperture, said tongue including means for weakening the tongue to facilitate lateral deflection thereof, a shoulder formed in the free end of said tongue for coaction with the web portion of the main beam to hold the tongue in the aperture when it is inserted therein and a deformable stop formed in the free end of the tongue in spaced relation from the shoulder, said stop designed to coact with the web portion of the main beam to lock the tongue within the aperture, and to deform during expansion of the interlocked main and cross beams while maintaining the substantially predetermined spatial disposition of the main and cross beams and the coacting co-planar relationship of the panel members intact.

5. The grid structure of claim 4 in which the tongue of the cross beam includes separate means formed in the free end of the tongue for supporting coaction with the web portion of the main beam as the tongue is inserted in the aperture.

References Cited by the Examiner
UNITED STATES PATENTS

| | | | |
|---|---|---|---|
| 1,937,762 | 12/33 | Kessler | 189—37 X |
| 2,903,104 | 9/59 | Brown | 189—36 |
| 3,023,861 | 3/62 | Bak | 189—36 |
| 3,096,862 | 7/63 | Purdy | 189—36 |

RICHARD W. COOKE, Jr., *Primary Examiner.*